(12) United States Patent
Labonte et al.

(10) Patent No.: US 8,880,952 B1
(45) Date of Patent: Nov. 4, 2014

(54) GENERIC AND EXTENSIBLE PROVIDER DEBUG INTERFACE

(75) Inventors: Kevin S. Labonte, Upton, MA (US);
Deene Dafoe, Northborough, MA (US);
Daniel A. Lottero, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 419 days.

(21) Appl. No.: 13/419,910

(22) Filed: Mar. 14, 2012

(51) Int. Cl.
*G06F 11/00* (2006.01)

(52) U.S. Cl.
USPC .................. 714/38.14; 714/38.1; 717/124

(58) Field of Classification Search
CPC ............ G06F 11/3664; G06F 11/3476; G06F 11/3668
See application file for complete search history.

(56) References Cited

U.S. PATENT DOCUMENTS

| | | | | |
|---|---|---|---|---|
| 5,901,315 | A * | 5/1999 | Edwards et al. | 717/124 |
| 6,915,457 | B1 * | 7/2005 | Miller | 714/43 |
| 6,938,185 | B1 * | 8/2005 | Bebout et al. | 714/28 |

OTHER PUBLICATIONS

Labonte, et al., "Managing Data Storage in Virtual Systems", U.S. Appl. No. 13/249,302, filed Sep. 30, 2011.
Shajenko et al., "Managing Caches for Reporting Storage System Information", U.S. Appl. No. 13/249,323, filed Sep. 30, 2011.
Shajenko et al., "Techniques Using a Bidirectional Graph for Reporting to Clients", U.S. Appl. No. 13/200,662, filed Sep. 28, 2011.

* cited by examiner

*Primary Examiner* — Scott Baderman
*Assistant Examiner* — Jason Bryan
(74) *Attorney, Agent, or Firm* — Muirhead and Saturnelli, LLC

(57) ABSTRACT

Described are techniques for debugging code of a provider using a debug interface. The provider includes a first software layer providing common services and a second software layer including code modules each providing a set of customized services. The debug interface includes a first function interface for a first function having first code included in the first software layer and including a second function interface for a second function having second code included in the first software layer which provides for runtime transfer of control to code included in said second software layer. The first function is invoked to issue debug commands to debug code in the first software layer. The second function is invoked to issue debug commands to debug code in the second software layer. A client sends debug commands in accordance with the debug interface to a server including the provider.

20 Claims, 6 Drawing Sheets

GENERIC AND EXTENSIBLE PROVIDER DEBUG INTERFACE

BACKGROUND

1. Technical Field

This application relates to techniques used in connection with interfaces defined for providing services, and more particularly in connection with providing a debug interface in connection with a provider.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system acting as a server, techniques may be used in connection with debugging code of the server. Server code may include many different entities such as components, programs or modules, where each such entity may provide its own debug interface to be invoked by a debug client in connection with debugging the particular entity's code. For example, a first component may provide a first debug interface including a first set of defined functions which are invoked when debugging the first component. The debug client uses the first set of defined functions when issuing debug commands to the first component. A second different component may provide a second debug interface including a second set of defined functions which are invoked when debugging the second component. The debug client uses the second set of defined functions when issuing debug commands to the second component. Thus, the first and second sets of defined functions may be different so that the debug client issuing debug commands needs to be aware of, and use, the appropriate set of functions of the various debug interfaces when debugging each component. As there are changes to the supported debug commands, the debug interfaces are modified. For example, if a new debug command is added for use with the above-mentioned first component, a new function may be added to the first set to support the new command thereby changing the first debug interface, or a defined interface of an existing function may be modified to support the new command thereby also changing the debug interface.

SUMMARY OF THE INVENTION

In accordance with one aspect of the invention is a method of debugging code of a provider comprising: receiving a debug interface for a provider included in a server, said provider including a first software layer providing common services and a second software layer including a plurality of code modules wherein each of said plurality of code modules provides a set of customized services, said common services being used in combination with the set of customized services provided by any of said plurality of code modules, said debug interface including a first function interface for a first function having first code included in said first software layer and including a second function interface for a second function having second code included in said first software layer which provides for runtime transfer of control to code included in said second software layer, said first function being invoked to issue any of a first set of debug commands to debug code in the first software layer and said second function being invoked to issue any of a second set of debug commands to debug code in the second software layer, wherein said second function is a same function used to issue debug commands to each of the plurality of code modules of the second software layer; sending, by a client to said server, a first debug command using said debug interface, wherein said first debug command is used to debug code included in said second software layer and said first debug command is sent to said server by said client calling said second function in accordance with said second function interface; and performing first processing on said server for processing said first debug command, said first processing including: invoking said second function by transferring runtime control to said second code of the first software layer, wherein said second code then passes the first debug command through to the second software layer by invoking third code in one of the plurality of code modules of the second software layer, said third code performing second processing for the first debug command including syntactic processing and semantic processing interpreting said first debug command and performing an action based on semantics of said first debug command. The first function interface may include a first parameter representing a debug command issued to debug code of the first layer. The first function interface may indicate that an invocation of said first function optionally includes one or more additional parameters representing parameters of a debug command represented as the first parameter in the invocation. The first layer may include code for processing each debug command in the first set of debug commands. The second function interface may include a first parameter representing a debug command issued to debug code of the second layer. The second function interface may indicate that an invocation of said second function optionally includes one or more additional parameters representing parameters of a debug command represented as the first parameter in the invocation. The second layer may include code for processing each debug command in the second set of debug commands. The second set of debug commands may be used to debug code in a first code module of the second layer and a third set of debug commands may be used to debug code in a second code module of the second layer, a first portion of debug commands in the second set not being included in the third set whereby the first portion of debug commands may not be recognized by code of the second module as valid debug commands for debugging code of the second code module. The second code passing the first debug command through to the second software layer may include said second code not performing syntactic or semantic processing of the first debug command prior to invoking said third code. The second layer may be a platform specific layer and each of the plurality of code modules may provide a different set of platform specific services. The plurality of code modules may provide sets of services for a plurality of data storage system platforms. The server may be included in a data storage system in accordance with one of the plurality of data storage system platforms providing data storage services to the client. The common services may include services provided for use with each of the plurality of data storage system platforms. Each of the plurality of code modules may provide a set of services for a different one of the plurality of data storage system platforms wherein each of the plurality of data storage system platforms varies with properties related to any of hardware and software of a data storage system. A first of the plurality of data storage system platforms may provide block-based storage services in connection with data storage system management and configuration and a second of the plurality of data storage system platforms may provide file-based storage services in connection with data storage system management and configuration. A first of the plurality of code modules may include code providing said block-based services and a second of the plurality of code modules may include code providing said file-based services. The common services of the first layer may include services used in connection with data storage system management across all the plurality of data storage system platforms. The provider may provider data storage management services to the client and the client may be a host system providing a virtualized environment and having a plurality of virtual machines executing on the host system. The plurality of virtual machines may have applications executing thereon which have application data stored on provisioned storage of storage devices of the data storage system. The provider may provide data storage management services to the client where the client may be an aggregator providing collective data storage management for a plurality of hosts. Each of the plurality of hosts may provide a virtualized environment and may have one or more virtual machines executing on said each host. Each of the one or more virtual machines may have an application executing in the context of said each virtual machine wherein the application has its application data stored on provisioned storage of storage devices of the data storage system. The provider may provide data storage management services for use in connection with data storage management and configuration in a virtualized environment whereby the data storage management and configuration may be performed for managing storage provisioned for use by a plurality of virtual machines hosting applications each having application data stored on provisioned storage of storage devices of the data storage system.

In accordance with another aspect of the invention is a computer readable medium include code for debugging code of a provider, the computer readable medium comprising code for: receiving a debug interface for a provider included in a server, said provider including a first software layer providing common services and a second software layer including a plurality of code modules wherein each of said plurality of code modules provides a set of customized services, said common services being used in combination with the set of customized services provided by any of said plurality of code modules, said debug interface including a first function interface for a first function having first code included in said first software layer and including a second function interface for a second function having second code included in said first software layer which provides for runtime transfer of control to code included in said second software layer, said first function being invoked to issue any of a first set of debug commands to debug code in the first software layer and said second function being invoked to issue any of a second set of debug commands to debug code in the second software layer; and sending, by a client to said server, a first debug command using said debug interface, wherein said first debug command is used to debug code included in a specific one of said first software layer or said second software layer, wherein if said specific one is said first software layer, said sending includes issuing a call to said first function, and if said specific one is said second software layer, said sending includes issuing a call to said second function.

In accordance with yet another aspect of the invention is a computer readable medium comprising code stored thereon for debugging code of a provider, the computer readable medium comprising code for: receiving a debug interface for a provider included in a server, said provider including a first software layer providing common services and a second software layer including a plurality of code modules wherein each of said plurality of code modules provides a set of customized services, said common services being used in combination with the set of customized services provided by any of said plurality of code modules, said debug interface including a first function interface for a first function having first code included in said first software layer and including a second function interface for a second function having second code included in said first software layer which provides for runtime transfer of control to code included in said second software layer, said first function being invoked to issue any of a first set of debug commands to debug code in the first software layer and said second function being invoked to issue any of a second set of debug commands to debug code in the second software layer, wherein said second function is a same function used to issue debug commands to each of the plurality of code modules of the second software layer; sending, by a client to said server, a first debug command using said debug interface, wherein said first debug command is used to debug code included in said second software layer and said first debug command is sent to said server by said client calling said second function in accordance with said second function interface; and performing first processing on said server for processing said first debug command, said first processing including: invoking said second function by transferring runtime control to said second code of the first software layer, wherein said second code then passes the first debug command through to the second software layer by invoking third code in one of the plurality of code modules of the second software layer, said third code performing second processing for the first debug command including syntactic processing and semantic processing interpreting said first debug command and performing an action based on semantics of said first debug command. The first function interface may include a first parameter representing a debug command issued to debug code of the first layer. The first function interface may indicate that an invocation of said first function optionally includes one or more additional parameters representing parameters of a debug command represented as the first parameter in the invocation. The first layer may include code for processing each debug command in the first set of debug commands.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
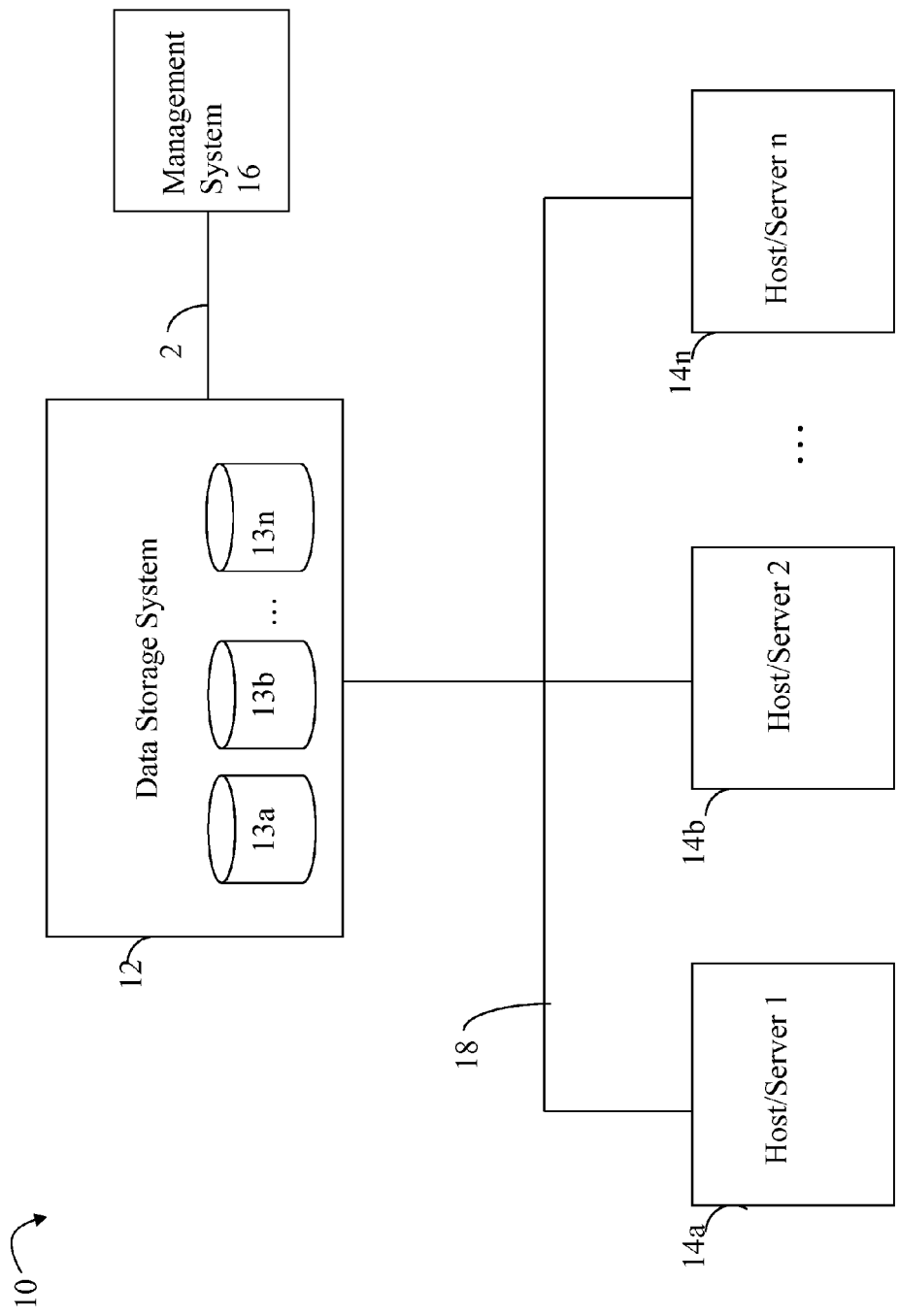
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices and/or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
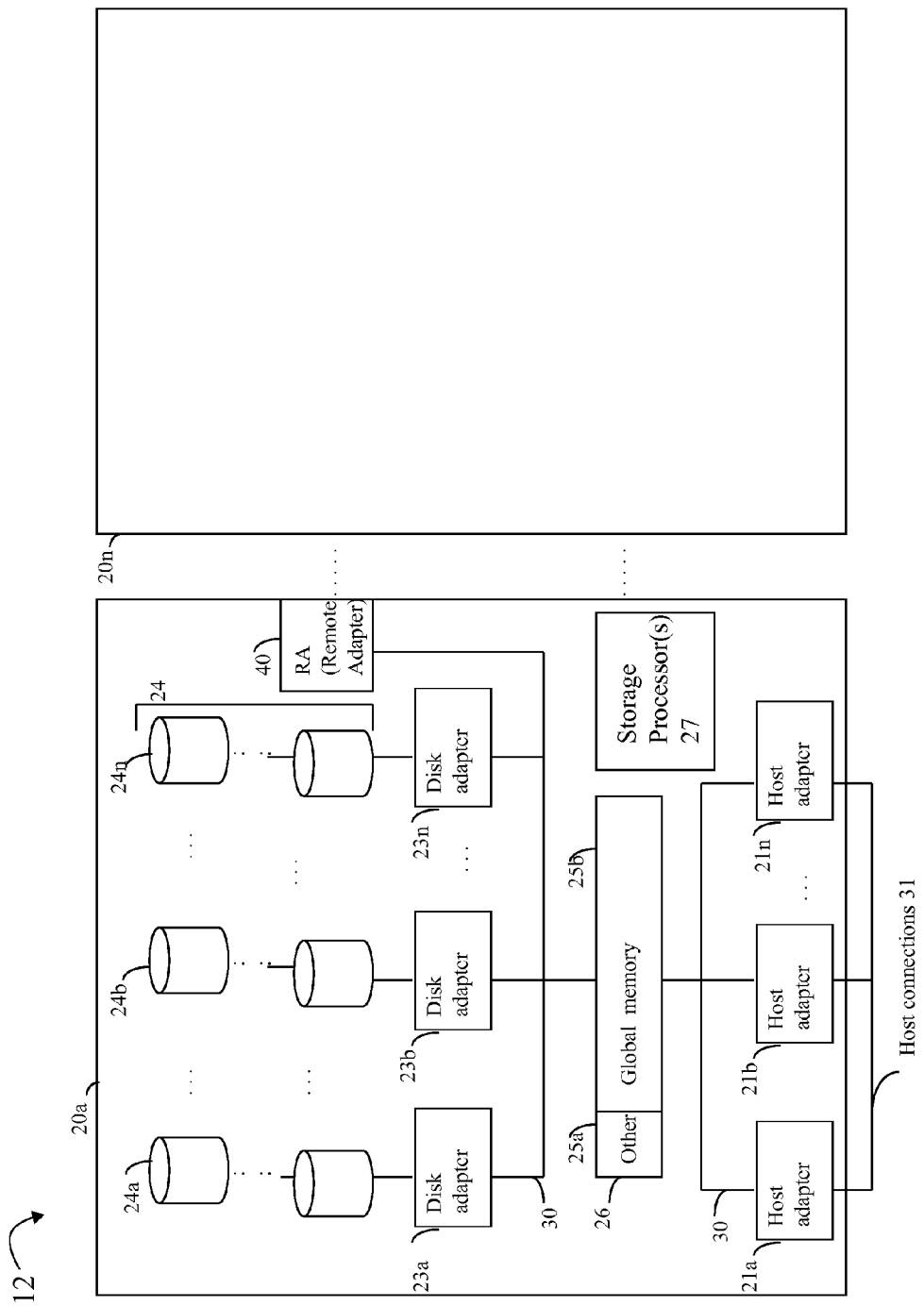
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with description set forth herein, the host may be characterized in one aspect as a client of the data storage system having storage provisioned on the data storage system. In some embodiments, the data storage system may provide the host with block-based storage services and host provisioned storage may be block-based. In connection with block-based storage services provided to the host, the provisioned storage of the data storage system may include one or more LUNs that are accessible or visible to a host, or more generally any client of the data storage system, over one or more paths between the client and data storage system. Each path may be defined as including two endpoints, a first on the client and a second on the data storage system. The first endpoint on the client may be an initiator port of a component such as an HBA of the host used in connection with communicating with the data storage system such as to send I/O requests to store and/or retrieve data on provisioned devices of the data storage system. The second endpoint of the data storage system may be a target port of the data storage system such as a port of an FA of the data storage system used in connection with communicating with the client. A client may have access to one or more LUNs included in a defined storage group (SG). Each initiator port may be configured to have access to a set of one or more target ports of the data storage system through which all LUNs of the single SG are accessible or visible. The foregoing information regarding defined paths, SG definitions, what LUNs and SGs are accessible over what paths, and the like, may be included in a data storage system configuration or topology. Such topology may change over time as changes are made to an existing data storage system configuration, for example, by adding/removing hosts thereby adding/removing paths, adding/removing LUNs from existing SGs, adding/removing HBAs to existing hosts thereby adding/removing paths, and the like.

In some embodiments, the data storage system may provide a client with file-based storage services. Such file-based storage services may be implemented on top of more primitive or basic services such as block-based as well as others. In this manner, storage of the data storage system is presented to the client as a file system. The client may access managed storage entities which are file-based such as file systems, and directories and files in a file system. Yet further, in some embodiment, the data storage system may provide a client with storage services that may be based on a combination of both block-based and file-based services (e.g., offering both file-level protocols (e.g., such as NAS or network attached storage protocols) and block-level protocols (e.g., such a SAN storage area network protocols such as SCSI, Fibre Channel, iSCSI, and the like) from the same storage system.

In connection with a data storage system, system management may be performed using a server, such as a data storage system management service of the data storage system, and a client, such as using client management software executing on a host or, more generally any suitable computer system. Generally, the client may issue requests to the server for information used in connection with data storage system management. Such information may relate to, for example, existing data storage configuration or topology, health and status information of data storage system components, and the like. Information regarding the data storage system configuration or topology may include, for example, identifying all paths between a host and the data storage system over which provisioned storage is accessible or visible, and other configuration information that may vary with whether the client is provided with file-based services and/or block-based services. For example, a client provided with block-based services in accordance with block-based protocols supported on a data storage system may be provided with data storage configuration information such as identifying a particular host initiator port (e.g., of an HBA) and data storage system target port (e.g., of an FA of the data storage system) included in a path, identifying what one or more LUNs are accessible over one or more paths (if the client is provided with block-based services), identifying what one or more LUNs are accessible from a particular host initiator port, identifying what data storage system target ports are accessible to a host having one or more host initiator ports, identifying what host initiator ports may be used to access storage through a particular data storage system target port, identifying what target initiator ports may be used to access storage through a particular host initiator port, identifying paths that may be used to access a particular LUN, identifying storage characteristics for LUNs (e.g., capacity, amount of consumed storage containing data, amount of free storage available for storing user data, RAID configuration), and the like. For a client provided with file-based services in accordance with file-based protocols, the client may be provided with data storage configuration information such as, for example, information identifying the file systems and associated file system attributes, files and directories in a file system, file attribute information (e.g., owner, access controls, date of last access, date of last modification, files size, etc.), quotas as may be defined per user or owner specifying storage capacity consumption limits for the user, storage capacity and usage as related to a file system or directory (e.g., what is the total storage capacity of a file system, how much of the storage is consumed, how much is free), and the like.

The foregoing are some examples of data storage configuration information as may be stored on the data storage system about its configuration. Such information may be provided to a client requesting such information in connection with data storage management. For example, data storage management software may execute on a host or other computer system, such as the management system 16 of FIG. 1 where such systems may generally function as a client making requests of the data storage system as a server. The management information may be provided to the client for display such as in connection with viewing aspects related to a current configuration of a data storage system. The client may request an initial set of information from and then perform subsequent requests at later points in time, for example, to obtain information regarding any updates to the existing topology or configuration. Such updates may include, for example, changes in connection with health or status of an existing component of the data storage system such as an indicator about whether a data storage system port is operable/can be used access LUNs, and the like, as may vary with the particular services (e.g., file-based and/or block-based) provided to a client.

Generally, the data storage system may include one or more providers in connection with providing services to the client such as the above-mentioned file-based and block-based services as well as others. In an embodiment in accordance with techniques herein, the code of such providers may be debugged by issuing debug commands in the form of requests from a client to the data storage system. What will now be described is a generic and extensible debug interface for use with the providers in order to debug code of the providers such as of the data storage system. The client may execute code, such as code of a debugger or using a script, which results in invocations of this debug API and to code of the providers for the purpose of performing various operations for debugging provider code modules.

Figure 3:
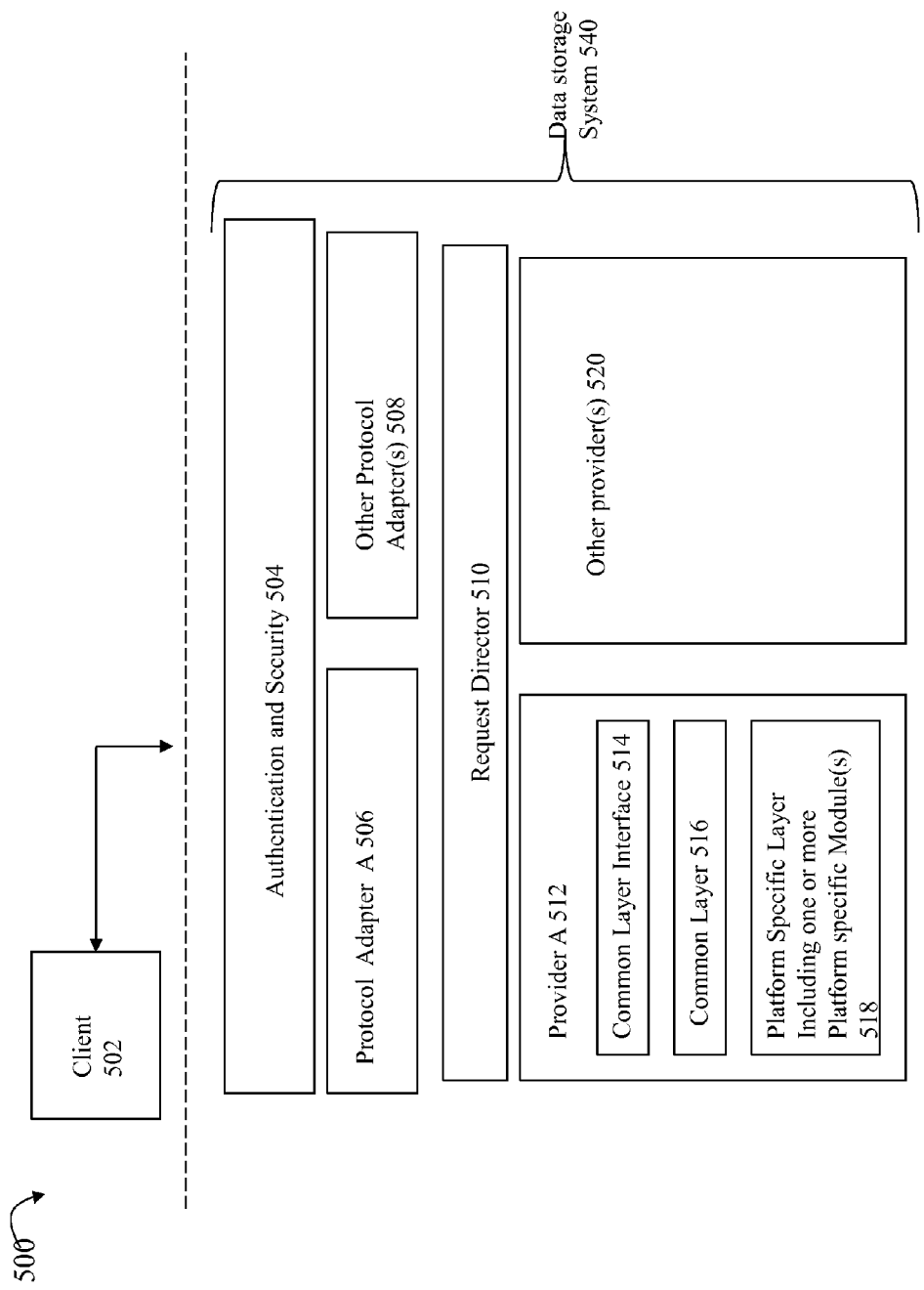
FIGS. 3, 4 and 6 are examples illustrating components that may be included in an embodiment in accordance with techniques herein.

Referring to FIG. 3, shown is an example of components that may be included in a system in an embodiment in accordance with techniques herein. The system 500 may include a client 502 which issues requests such as those that may include debug commands specified using the debug API described herein. The client 502 may communicate with a data storage system 540 that includes the components below the dashed line. The data storage system 540 may include an authentication and security component 504, protocol adapters 506, 508, request director 510, and providers 512, 520. Although described elsewhere herein but not illustrated for simplicity of FIG. 3, the data storage system 540 may include physical storage devices from which storage is provisioned for use by data storage clients. Element 506 denotes a protocol adapter whereby the protocol adapter converts or maps received messages from the client (based on the protocol used by the client) to one or more other messages having a protocol understood by the data storage system. In one embodiment, the protocol adapter selected (e.g. one of 506, 508 with reference to FIG. 3) may be based on the particular protocol used by the client. The request director 510 may then select the appropriate provider 512, 520 based on the content of the request received from the client. As an example, consider provider A 512 providing services to a particular set of clients operating in accordance with a first particular client protocol. The client 502 may send XML-based messages in accordance with the first client protocol using HTTP to the data storage system including the components of FIG. 3. The authentication and security component 504 may perform processing for client session authentication and security such as, for example, based on account name or user id and password. After successful authentication by component 504, requests may be received at the data storage system 540 from the client 502 based on the first client protocol such as noted above. Depending on the particular client protocol, one of the adapters 506, 508 may be selected to further convert or map the client request in accordance with a first protocol (e.g., the particular client's protocol) to one or more resulting requests in accordance with a second target protocol understood by the data storage system. In connection with this example, the protocol adapter A 506 may be selected based on the first client protocol. The resulting requests may be sent to a request director 510 which provides for further forwarding the requests to the appropriate provider which, in this example, is provider A 512 providing services to clients sending requests to the data storage system 540 based on the first client protocol. As noted above, the request director 510 may select an appropriate one of the providers 506, 508 based on the content of the received client request.

Provider A 512 may include a common interface layer 514 which specifies provider A's defined interface. For example, provider A 512 may perform one or more services or commands where each such service or command may be identified by a defined API call to a particular method or function with, optionally, any one or more parameters. The common layer interface 514 may be the mechanism by which such a defined interface is specified and then used by the request director 510 in connection with matching an API call in the client request to the appropriate provider. In the example herein, the provider A 512 may include a common layer 516 and one or more platform specific modules included in a platform specific layer 518. The common layer 516 may include a common set of defined APIs that may be used in connection with performing data storage management and configuration across multiple platforms. A data storage system platform may be generally defined as different hardware and/or software and associated functionality as may be included in a data storage environment of a data storage system to a client. Thus, a data storage system platform may vary due to differences related to software and/or hardware on a data storage system such as, for example, data storage system vendor, a particular type, model or family of data storage system provided by a vendor, storage services provided (e.g., file-based, block-based, or some combination), and the like. Therefore, the common layer 516 may be characterized as including a set of platform independent functions (also referred to as "interfaces" or "services") that may be used in connection with different types of data storage systems and varying services as provided to the client for the different data storage system platforms (e.g., a block based storage, file based data storage system). The set of platform independent functions as may be used in connection with data storage management and configuration with techniques herein may include functionality, for example, for validating and storing client certificates, management of a secure connection and session context, and management of an event queue and alarm queue (e.g., such as in connection with management and notification of consumed storage in accordance with defined storage quotas whereby an indication may be fired in response to amounts of consumed storage approaching defined limits). Such platform independent functions are generally applicable for use in connection with data storage management and configuration across multiple data storage system platforms (e.g., the same set of platform independent functions may be used on types of different data storage systems, may be used in connection with data storage systems providing only file-based services and may also be used in connection with data storage systems providing only block-based services, and the like).

The platform specific layer 518 may include one or more platform specific modules whereby each such platform specific module may include a set of functions that are specific to some aspect of a data storage system platform such as, for example, applicable only to a particular type of data storage system 540 and providing data storage management and configuration functionality for this particular platform. For example, block-based storage services may be a first platform specific module of the platform specific layer 518 which includes functionality for use with data storage system management and configuration that is specific to providing block-based storage services such as collecting information and performing operations regarding block-based entities (e.g., LUNs), transforming block storage objects into storage objects that may be processed by the common layer 516, reporting storage system information (e.g., storage topology, configuration information) regarding configured LUNs, unprovisioned physical storage devices, and the like. Such block based storage services provided by the first platform specific module may include support for storage management APIs that may provide storage information such as a list of storage entities (e.g. LUNs) based on a type of a storage entity, details of storage topology of the storage entities, storage properties for the storage entities, and events for reporting configuration changes. As another example, the platform specific layer 518 may include a second platform specific module which includes functionality specific to providing file-based storage management and configuration services such as collecting information and performing operations regarding file-based entities (e.g., files, directories, file system(s)). The second platform specific module may include support for storage management APIs providing storage management information related to file-based storage management as described herein. The foregoing first and second platform specific modules may each be applicable to a different data storage system platform. For example, a first data storage system platform may be for a first type of data storage system that only provides its clients with block-based services and storage management in connection with such block-based entities. The above-mentioned first platform specific module may be used to provide such platform specific services for this first data storage system platform. A second data storage system platform may be for a second type of data storage system that only provides its clients with file-based services. The above-mentioned second platform specific module may be used to provide such platform specific storage management services for this second data storage system platform.

Figure 4:
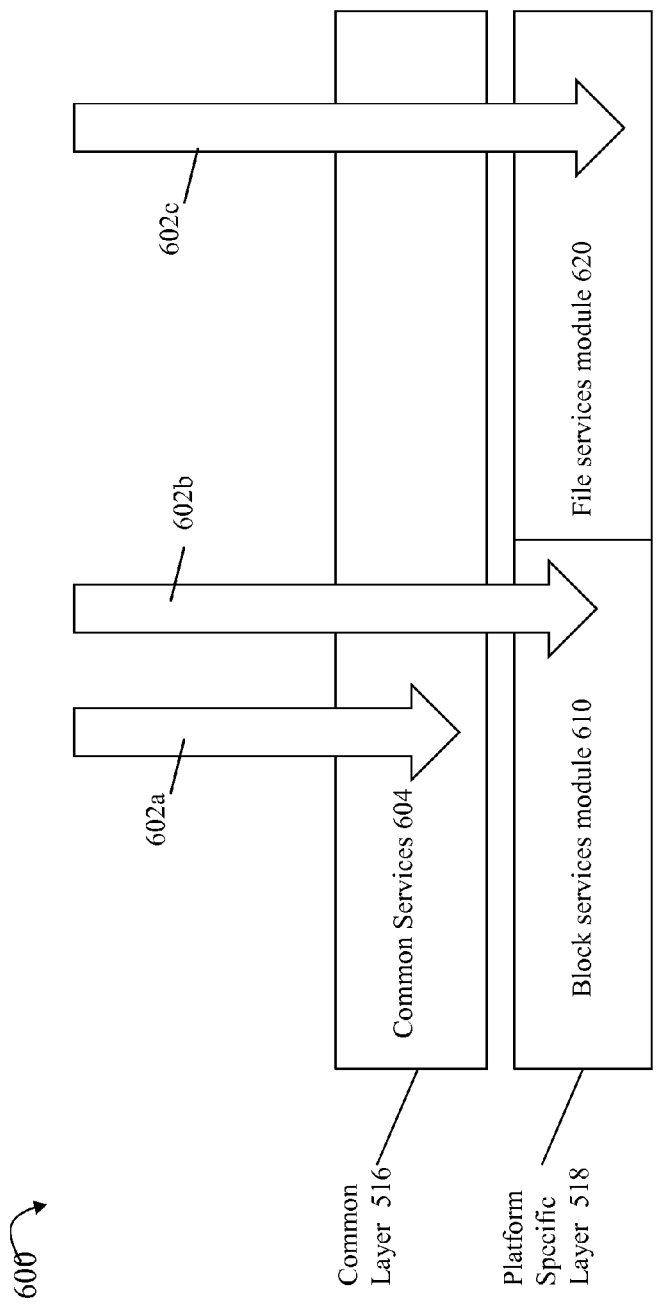

Referring to FIG. 4, shown is an example 600 illustrating in more detail services and modules that may be provided by the different layers of a provider in an embodiment in accordance with techniques herein. The example 600 illustrates further detail regarding provider A 512 of FIG. 3. The common layer 516 may provide common services 604 such as mentioned above and elsewhere herein. The platform specific layer 518 may provide platform specific services such as mentioned above and elsewhere herein. The layer 518 may include a block services module 610 and a file services module 620 that provide platform specific storage management services depending on the particular data storage system platform for which the layer 518 is providing services. The block services module 610 may be the first platform specific module described above providing block-based storage services for data storage system management and configuration, and the file services module 620 may be the second platform specific module described above providing file-based storage services for data storage system management and configuration.

Arrows 602*a-c* illustrate possible runtime execution flows to the layers of the provider A 512 as illustrated in the example 600. Element 602*a* represents that a client request specifying a common services API of the common layer 516 may result in invocation of code only in the layer 516. Element 602*b* represents that a client request specifying a block services API call of the platform specific layer 518 may result in invocation of code in module 610 of the layer 518. Additionally, the call for the block services may be forwarded by, or passed through, the common layer 516 rather than be directly forwarded to layer 518. In other words, as represented by 602*b*, code of module 610 is not directly invoked from a layer above the common layer 516. Rather, in one embodiment described herein, the block services call results in first transferring control to first code in the common layer 516 whereby the first code in the common layer 516 then forwards or passes through the call to the block services module 610 by further invoking second code for the appropriate API of the block services module 610.

Element 602*c* illustrates runtime transfer of control in connection with a file services-based API call in a manner similar to that as denoted for 602*b*. Element 602*c* represents that a client request specifying a file services API call of the platform specific layer 518 may result in invocation of code in module 620 of the layer 518. Additionally, the call for the file services may be forwarded by, or passed through, the common layer 516 rather than be directly forwarded to layer 518. In other words, as represented by 602*c*, code of module 620 is not directly invoked from a layer above the common layer 516. Rather, in one embodiment described herein, the file services API call results in first transferring control to first code in the common layer 516 whereby the first code in the common layer 516 then forwards or passes through the call to the file services module 620 by further invoking second code for the appropriate API of the file services module 620.

It should be noted that each of the platform specific services modules 610 and 620 may be implemented as shared libraries of code, such as DLLs (dynamic link libraries) or other entities that may vary with embodiment. For a data storage system providing only block services, module 610 would be loaded on the data storage system for use with techniques herein but not module 620. For a data storage system providing only file services, module 620 would be loaded on the data storage system for use with techniques herein but not module 610. If a data storage system provided some portion of both block and file services as illustrated by code of 610 and 620, then yet a third module may be prepared as a shared library including appropriate code for such services and the third module would be loaded for use with techniques herein (rather than the modules 610 and 620). Thus, generally, the platform specific layer 518 may include one or modules where each such module may be implemented as a separate library. A selected library including code of the appropriate platform specific module may be loaded based on the particular data storage system platform being used in connection with techniques herein.

In connection with an embodiment described herein, techniques may be utilized in connection with debugging code in the common layer 516 and also in the product specific layer 518. As described above, the common layer 516 may be characterized as including services that may be used by any client when performing data storage system management for any data storage system platform. The product specific layer 518 includes modules with different and varied functionality customized for performing data storage management for the different products or platforms. The layer 518 may include multiple such platform specific modules whereby each such platform specific module includes specific or platform dependent functions or routines customized for the particular data storage system platform. As just described and illustrated in connection with FIG. 4, incoming calls at runtime to the provider A 512 may be received by the common layer 516. Additionally, if the call is to a platform specific module, the call typically passes through the common layer 516 to the platform specific layer 518 whereby the incoming call at runtime is first received by the common layer 516 and then passed through to the product specific layer 518.

In connection with an embodiment described herein, techniques may be utilized in connection with debugging code in the common layer 516 and also in the product specific layer 518 as noted above. To this end, an embodiment may define a debug API including two methods—a first method for the common layer debug API for such calls which terminate at the common layer 516 and a second method for the platform specific layer debug API for such calls which terminate at a module in the platform specific layer 518.

The above-mentioned first method for the common layer debug API for such calls which terminate at the common layer 516 (e.g., such as illustrated by 602*a* of FIG. 4) may have a defined API in the common layer interface 514 represented as follows:

Common_debug (debug_command, debug_command_parameter1, . . . , debug_command parameterN)
where:

"Common_debug" is the name of the first method having "debug_command" as its first parameter followed by one or more optional additional method parameters.

"debug_command" is a string representing the debug command to be executed by code of the common layer 516.

"debug_command_parameter i" is a string denoting the "ith" parameter used by the debug command (e.g., denoted by "debug_command" in the first method call). With reference to the above, let N represent the number of optional debug command parameters, where each ith additional debug parameter (i being an integer from 1 . . . N) is denoted as "command_parameter i". The "ith" debug command parameter is the "i+1" parameter of the common_debug API method call.

Thus, the first method call (e.g., common_debug API method call) may include at a minimum just a first parameter "debug_command" denoting a debug command to be executed with no debug command parameters.

The above-mentioned second method for the platform specific layer debug API for such calls which terminate at the product specific layer 518 (e.g., such as illustrated by 602*b*, 602*c* of FIG. 4) may have a defined API in the common layer interface 514 represented as follows:

Platform_specific_debug (debug_command, debug_command_parameter1, . . . , debug command parameterN)
where:

"Platform_specific_debug" is the name of the second method having "debug_command" as its first parameter followed by one or more optional additional method parameters.

"debug_command" is a string representing the debug command to be executed by code of the platform specific layer 518.

"debug command_parameter i" is a string denoting the "ith" parameter used by the debug command (e.g., denoted by "debug_command" in the second method call). With reference to the above, let N represent the number of optional debug command parameters, where each ith additional debug parameter (i being an integer from 1 . . . N) is denoted as "command_parameter i". The "ith" debug command parameter is the "i+1" parameter of the Platform_specific_debug API method call.

Thus, the second method call (e.g., Platform_specific_debug API method call) may include at a minimum just a first parameter "debug_command" denoting a debug command to be executed with no debug command parameters.

It should be noted that an embodiment may alternatively represent the debug commands and any debug command parameters in the first and/or second methods using constants, enumerated type values, or other suitable values. Generally, the types associated with each parameter of the first and second methods may be generic such as all of type string, all of an integer type, and the like. The particular type selected for such method parameters does not indicate the type of the parameters such as used in connection with semantic interpretation of the debug command parameters. For example, an embodiment may encode each of the method parameters as a string including those parameters which may represent numeric or integer type values for use with particular debug commands. As described in more detail elsewhere herein, processing may be performed by code of the layers 516 and/or 518 (also referred to as the target layer elsewhere herein) which includes syntactic and semantic processing for a debug command used to debug code of that particular layer. Such processing for the debug command may also include mapping the generic type of a method parameter to another type suitable for use with the debug command (e.g., mapping a method parameter of type string having a value of "1" to a suitable integer type for use as an integer value as a debug command parameter).

In connection with this second method, the code of the common layer 516 may simply pass the second method parameters denoting the debug command (e.g., first parameter of the second method call) and any debug command parameters (e.g., second and additional parameters of the second method call) to code of the product specific layer 518. For example, the code of the common layer of the second method may invoke other code of the platform specific layer passing the foregoing debug command and debug command parameters (specified as method call parameters for the second method).

The above-mentioned two methods of the interface are extensible in several aspects. The debug command and debug parameters of the two methods may denote any defined debug command and its optional debug parameters. Thus, as new debug commands are added, existing commands removed, or otherwise modified (e.g., add or change a debug command parameter), for example, to the common layer, no change to the first method, the common layer debug API, is needed. For new debug commands added to the common layer or for any changes made to common layer debug commands, code may be added to the common layer to support such changes (e.g. for any new debug commands) and the client or other code (such as a script) performing the debug API call using the first method simply adds appropriate first method calls with the correct one or more method parameters for the new debug command. In a similar manner, as new debug commands are added to the platform specific layer, no change to the second method, the product specific layer debug API, is needed. Code may be added to the product specific layer to support the new debug command and the client or other code (such as a script) making the debug API call using the second method simply adds appropriate second method calls with the correct one or more method parameters for the new debug command.

Additionally, as such debug commands are added to the product specific layer (or other debug command modifications to remove or modify an existing debug command are made with respect to debug commands of the product specific layer), no code changes in the common layer are necessary to accommodate such changes such as for use of the new debug command in the product specific layer. This is due to the fact that each parameter of the second method is not interpreted by the common layer and simply and transparently passed through to the platform specific layer (e.g. the common layer code invokes code of the platform specific layer passing the second method parameters—passing the debug command and any optional parameters for the platform specific layer).

The above-mentioned first and second methods may comprise the debug API thereby providing a generic extensible debug interface for use in connection with debugging where the invoked code that performs the processing for the requested debug operation is located either in the common layer 516 (e.g. invoke the above-mentioned first method for debugging) or the platform specific layer 518 (e.g., invoke the second above-mentioned method for debugging). As noted above, if the code being debugged is located in the platform specific layer and the foregoing second method is used, the runtime call to the second method may be first received by the common layer which then passes control and parameters to the appropriate platform specific layer module. Thus, in accordance with techniques herein using the debug interface, a new debug command or other debug command change may be made with respect to the set of debug commands utilized for debugging the product specific layer without changing or impacting code in the common layer.

In an embodiment in accordance with techniques herein, a debug command may be processed by the particular layer including the code being debugged. In this case, for example, a debug command issued using the second method described herein to debug code of the platform specific layer may be "passed through" to the platform specific layer by the common layer without the common layer performing syntactic or semantic processing of the debug command and its parameters, if any. Such processing related to syntactic and/or semantic processing of the debug command may be performed by the platform specific layer. In this context, the platform specific layer may be characterized as the target or receiving endpoint layer of the debug command whereby the target or endpoint layer includes the code being debugged and therefore performs processing to interpret and execute the debug command. In other words, the target or endpoint layer may include code which processes the debug command and any parameters syntactically and semantically. As known in the art, syntax generally refers to grammatical structure whereas the term semantics refers to the meaning of the command and any parameters after it has been recognized as a particular command by syntactic processing. An embodiment may use any suitable technique known in the art for syntactic processing and recognition of the debug command and any parameters such as, for example, using syntax rules, grammars, parsers, and the like. Once the particular debug command and any parameters have been recognized by such syntactic processing, additional processing may be performed based on the particular semantics of the debug command. Such additional processing may including applying semantic rules to determine semantic validity of the debug command and applying or implementing the debug command by performing one or more actions. For example, semantic processing to determine semantic validity of a debug parameter may include testing the value of a parameter as being within a particular range if the parameter represents and integer type value. Applying or implementing the debug command semantics may be part of executing the debug command. For example, a debug command to dump or list a set of data items may include performing a first action to retrieve current values for such data items and then a second action to output the retrieved data item current values.

In a similar manner to that described above with respect to the platform specific layer including the code to be debugged when the second method is used, the common layer may also be characterized as the target or receiving endpoint layer of the debug command when the first method is invoked with a debug command whereby the common layer includes the code being debugged and therefore performs processing to interpret and execute the debug command. In this manner, if there are changes made with respect to debug commands used to debug code of a particular layer, the code of that layer only may be impacted without affecting other layers (or other modules of the same layer) of the provider and without requiring modification to the debug API.

Figure 5:
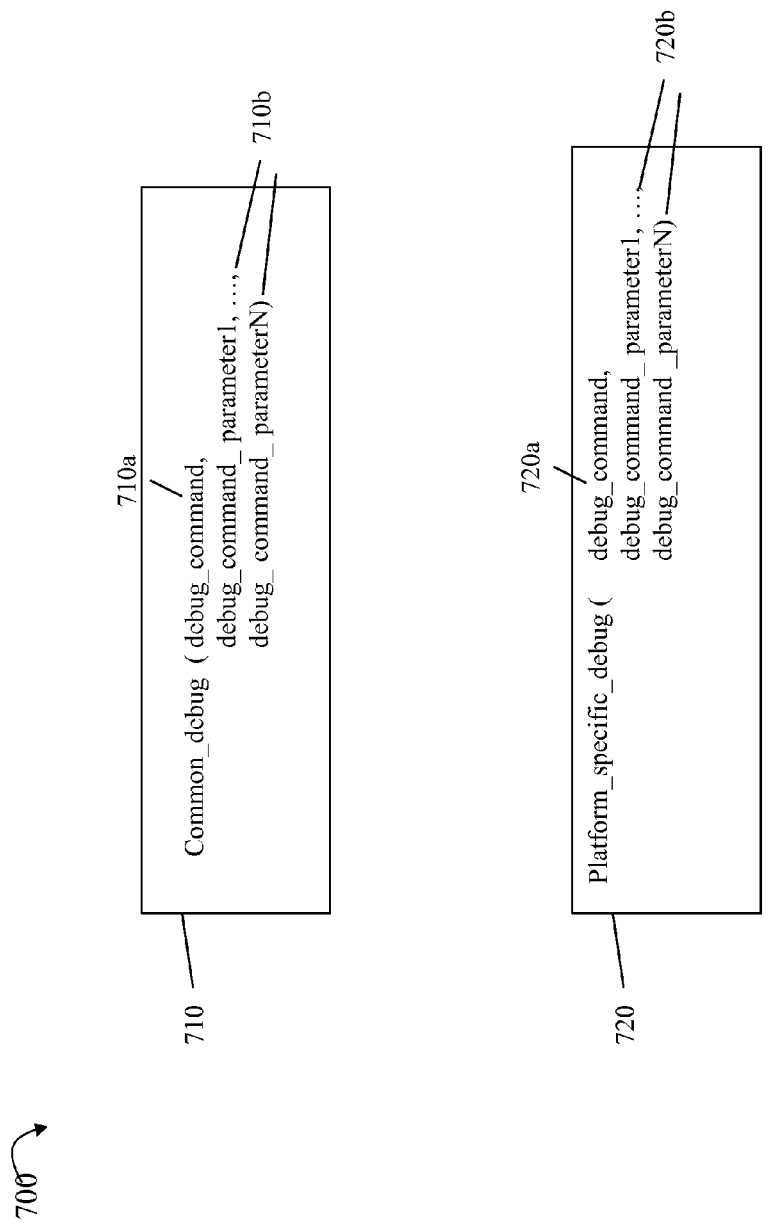
FIG. 5 is an example of a debug API (application programming interface) that may be used in an embodiment in accordance with techniques herein.

With reference now to FIG. 5, shown is an example illustrating the debug API as just described. In the example 700, the debug API in accordance with techniques herein may include the first method 710 invoked when issuing a debug command to the common layer of the provider. Element 710a denotes that the first method parameter is the debug command optionally followed by one or more debug command parameters 710b. The debug API in accordance with techniques herein may include the second method 720 invoked when issuing a debug command to the platform specific layer of the provider. Element 720a denotes that the second method parameter is the debug command optionally followed by one or more debug command parameters 720b. In connection with techniques herein, the debug API may include one method or function used for issuing all debug commands to a single layer. For example, the method of 710 may be used to issue all debug commands directed to the common layer for debugging code of the common layer. The method of 720 may be used to issue all debug commands directed to any module of the platform specific layer for debugging code of the platform specific layer. Thus, the same single debug API of 720 is used, for example, when issuing all desired debug commands to debug code of module 610. Also the same single debug API of 720 is used, for example, when issuing all desired debug commands to debug code of module 620. As there are changes to debug commands (e.g., including any addition or deletion of debug commands) supported by a particular platform specific module, the debug API does not change. Rather, for example, adding support for a new debug command means that code of the affected platform specific module is added for the new command (e.g., to recognize, interpret, and execute the new debug command) without modifying the debug API 720. The new debug command may be specified as a new additional value as the first parameter of the method 720.

In connection with techniques herein, it should be noted that it may not be desirable to expose the platform specific module or layer interface directly to the client. For example, the platform specific module interfaces of the product specific layer may be proprietary. As such, the techniques herein provide for use of the above-mentioned second method as the debug API when issuing debug commands to the product specific layer whereby runtime control is indirectly transferred to the product specific layer through the common layer.

An embodiment may provide a different platform dependent module for each different type of data storage system where the type varies with a particular storage system of a supported vendor. For example, EMC Corporation is a vendor of a variety of different data storage arrays such as the Symmetrix™ or VNX™ family of data storage systems manufactured by EMC Corporation. Thus, an embodiment may include a first platform specific module for use with a Symmetrix™ data storage array and a second platform specific module for use with a VNX™ data storage array. As a further variation, depending on the particular configuration of a VNX™ data storage array, the VNX™ data storage array may be configured to provide block services only, file services only, or a combination of the foregoing to the client. To this end, an embodiment may include three different platform specific modules for use with the foregoing three possible sets of file and/or block-based storage services that vary with the particular platforms for the VNX™ data storage array type. In connection with techniques herein, the same second method described herein for the platform specific layer debug API for such calls which terminate at the product specific layer 518 (e.g., Platform_specific_debug (debug_command, debug_command_parameter1, . . . , command parameterN)) may be used for issuing debug commands to any of the foregoing platform specific modules.

More generally, the modules comprising the platform specific layer may be customized for additional variations besides variations with respect to data storage system platform. More generally, the platform specific layer may be further characterized as a lower layer of customized or specialized provider modules that may be used with the techniques herein to provide a generic debug interface (e.g., the above-mentioned second method) that may be used with any such customized or specialized provider module of the lower software layer (e.g., layer 518). For example, the particular customized specific module may also vary with the particular client and debug commands that may be used by the client to debug the customized specific module whereby the foreign specific module is "customized" or varies with respect to other modules of the lower layer independent of the particulars of the data storage system platform and data storage system environment. To further illustrate, consider a data storage array such as a Symmetrix™ data storage system by EMC Corporation. For the same data storage system, a first client may use a first set of debug commands and a second client may use a second different set of debug commands having any of different command syntax, different debug command names, different parameters, etc, in comparison to the first set. The first client may use debug commands that are a first language such as English and the second client may use debug commands in a second different language such as French, Spanish, German, Chinese, or any other language. As such, a different customized provider module may be loaded for use with techniques herein depending on the particular client. In connection with the foregoing as a variation, the first client may use debug commands in connection with debugging block-based storage system services for storage management and configuration (e.g., customized for block-based storage entities and properties such as LUNs) since storage clients may not utilize any file-based protocols and the second client may use debug commands in connection with debugging file-based storage system services for storage management and configuration (e.g., customized for file-based storage entities and properties such as file systems, directories, files) since storage client may not utilize any block-based protocols. As such, a different customized provider module may be loaded for use with techniques herein depending on the particular storage clients that may use a data storage system and the storage services used by such storage clients.

As yet another example, different software developments groups may independently develop provider software used in the data storage system. As a result, the different software development groups may have independently developed different sets of debug commands with different syntaxes, commands, and the like). In accordance with techniques herein, different customized provider modules may be included in the customized layer (e.g., generalization of the platform specific layer 518) to support the different sets of possible debug commands. For example, if there are two such software development groups that each have their own set of debug commands, two customized modules may be included, one for each set of debug commands whereby control may be transferred at runtime to the appropriate customized module by the common layer using the debug API such as illustrated using the above-mentioned second method. In connection with such a generalization with respect to the platform specific layer 518, layer 518 of FIG. 4 may more generally represent a lower layer of customized or specific modules as described elsewhere herein.

To further illustrate use of the techniques herein such as using the above-mentioned first and second methods, consider an exemplary embodiment with reference to FIG. 4 in debugging code of a provider providing data storage services in connection with data storage management and configuration as described elsewhere herein in more detail. The platform specific layer may include code modules as in FIG. 4 for data storage system platform specific services whereby the common layer services may be used across or with data storage system platforms providing block services or file services. A client may issue debug commands to debug code of the provider where some commands may be directed to debugging code of the common layer 516 and other commands may be directed to debugging code of one of the modules 610 or 620 depending on the particular data storage system platform (e.g., properties of the data storage system including the provider). In this example, assume the data storage system has a platform that only provides block-based services so module 610 is loaded but not module 620. The client may issue a first debug command that is a common layer debug command to print or obtain a list of current sessions regarding connected clients. To issue this first debug command, "LIST_SESSIONS", the client may invoke the first method of the debug API (application programming interface) as follows with no parameters:
    COMMON_DEBUG(LIST_SESSIONS)
The client may issue a second debug command (e.g., GET_SESSION_INFO) to the common layer to list additional information or attributes about a particular session (e.g., denoted as SESS_ID parameter) by invoking the first method as follows:
    COMMON_DEBUG(GET_SESSION_INFO, SESS_ID)
The client may issue a third debug command (e.g., LIST_LUNS) to the module 610 of the platform specific layer to obtain a list of LUNs and associated LUN attributes as follows using the second method of the debug API:
    Platform_specific_debug (LIST LUNS)
with no debug parameters.

The client may issue a fourth debug command (e.g., GET_LUN_INFO) to the module 610 of the platform specific layer to obtain a dump of attribute information for a particular LUN (e.g., LUNID) by issuing a call using the second method of the debug API as follows:
    Platform_specific_debug (GET_LUN_INFO, LUNID)
The client may issue a fifth debug command (e.g., SET_LUN_INFO) to the module 610 of the platform specific layer to set or modify attribute information for a particular LUN (e.g., LUNID) by issuing a call using the second method of the debug API as follows:
    Platform_specific_debug (SET_LUN_INFO, LUNID, property1=value1)
where the debug command is SET_LUN_INFO, the first debug parameter is LUNID denoting the particular LUN having its attributes set or modified, the second debug parameter is an attribute or property-value pair, "property1=value1", whereby "property1" denotes a particular LUN property or attribute that is set to the value "value1". For this debug command, an attribute or property value pair may be specified as a debug parameter for each LUN property to be set.

The client may issue a sixth debug command (e.g., START_POLL) to the module 610 of the platform specific layer to commence or start a polling cycle such as to obtain a new or updated set of data storage configuration information by issuing a call using the second method of the debug API as follows with no debug parameters:
    Platform_specific_debug (START_POLL).

Now, consider an alternate embodiment where module 620 is loaded for use in the platform specific layer rather than the module 610. In this case, the client may issue the same common layer debug commands such as the above-mentioned first and second debug commands. However, rather than issue the above-mentioned remaining third through sixth debug commands, the client may issue the following debug commands to the module 620 of the platform specific layer using the second method of the debug API:
DEBUG COMMAND A: Platform_specific_debug (LIST FILE SYSTEMS) with no debug parameters to obtain a dump of all file systems and file system level attribute information.
DEBUG COMMAND B:
    Platform_specific_debug (GET_FILE_PPTY, C:/root.DIR1/FILE1, PARTIAL) to obtain a complete or partial list of file attributes where "GET_FILE_PPTY" is the debug command, "C:/root.DIR1/FILE1" identifies the file by specifying a complete path to the file, and "PARTIAL" is one of a defined set of possible options which indicates that a partial list of file attributes are obtained. It should be noted that the second debug parameter as represented by the third method parameter may be either PARTIAL as above or "ALL" to alternatively denote to obtain a complete list of all file attributes for the specific file denoted by the second debug parameter.
DEBUG COMMAND C: Platform_specific_debug (GET QUOTA LIMITS, USER1) to obtain any defined file system quota limits regarding storage that may be consumed by the user "USER1".

An embodiment in accordance with techniques herein may operate in accordance with the Storage Management Initiative Specification (SMI-S), and Common Information Model (CIM) technologies which are examples of specifications and models well known by those skilled in the art. SMI-S and CIM are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application. For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

With reference back to FIG. 3, the client 502 may be a CIM client for a storage management application that is a CIM server. The components illustrated as being included in the data storage system 540 may be included in the CIM server executing on the data storage system 504. In such an embodiment, the techniques herein may be further used in connection with a provider of storage services for use in connection with management and configuration of data storage for virtualized computing environments. Thus, the techniques herein may be used to debug code of such a provider and a client may issue debug commands to the server including the provider whereby such debug commands may be in accordance with description herein such as, for example, using the debug API of FIG. 5. This is described in more detail below with reference to FIG. 6.

Figure 6:
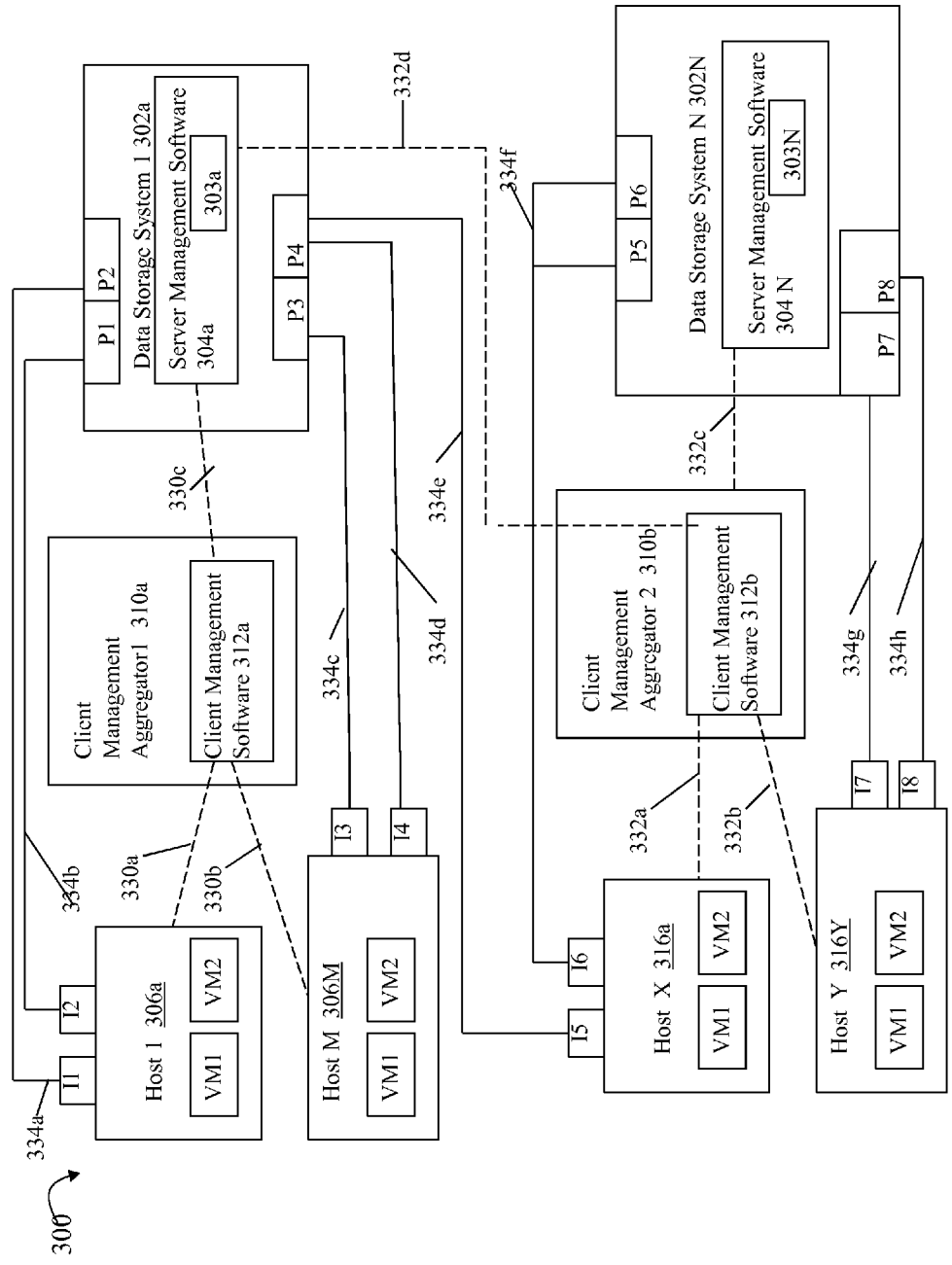

With reference now to FIG. 6, shown is another example an embodiment which may utilize techniques described herein. In the example 300, included are hosts 306a, 306M, hosts 316a, 316Y, client management aggregators 310a, 310b, and data storage systems 302a,302N. Initiator ports of the hosts are denoted as I1-I8. Target ports of the data storage systems are denoted as P1-P8. Solid lines 334a-334h denote data paths used for transmitting I/O operations or data requests and requested data between connected components (e.g., between a host and a data storage system). Dashed lines 330a-330c, and 332a-332d denote management or control paths between aggregator 310a and hosts 306a, 306M, between aggregator 310a and data storage system 302a, between aggregator 310b and hosts 316a, 316Y, between aggregator 310b and data storage system 302a and between aggregator 310b and data storage system N. Such control paths may be used in connection with issuing commands, and the like, for performing data storage management and configuration.

Each of the hosts and data storage systems may be as described elsewhere herein with the difference that the hosts 306a, 306M and the hosts 316a,316Y may each not include client management software and each such host may also provide a virtualized environment including one or more virtual machines (VMs) for executing applications on each such host. Each VM may have an application executing in the context of the VM where the application's data is stored on provisioned storage devices of one or more of data storage systems 302a,302N. Each of the hosts 306a,306M and the hosts 316a,316Y may include a hypervisor that performs VM management in connection with multiple VMs such as VMware ESX Server by VMware, Inc. Such a hypervisor, or more generally, VM manager, of each host having VMs executing therein may be installed and run directly on host hardware without requiring an underlying operating system. Each of the VM managers may perform management of the underlying host's physical resources for use among the multiple VMs that can run simultaneously.

Each of the client management aggregators 310a, 312b may function as host management aggregators or centers providing data storage management for a plurality of hosts or, more generally clients of the data storage system. Each of the elements 310a, 310b may function as a client obtaining data storage management and configuration from the use in managing storage for the virtualized environment. For example, aggregator 310a may be used to perform data storage management and configuration for hosts 306a,306M connected to 310a over various management or control paths 330a, 330b. In a similar manner, aggregator 310b may be used to perform data storage management and configuration for hosts 316a, 316Y connected to 310b over various management or control paths 332a, 332b. Each of 310a, 310b may include software thereon for performing such management for multiple hosts running virtualized environments as illustrated. For example, each of 310a, 310b may include VMware vCenter™ Server software that provides for a central, scalable and extensible platform for virtualization management of multiple virtualized hosts. In connection with techniques herein, each of the aggregators 310a, 310b may include, respectively, client management software 312a, 312b. Thus, the aggregators 310a, 310b may function as an intermediate component between the virtualized hosts and the data storage systems. In this manner, aggregator 310a may communicate with data storage system 302a and hosts 306a,306M where system 302a has storage provisioned thereon for use by the hosts 306a,306M. Similarly, aggregator 310b may communicate with data storage systems 302a,302N and hosts 316a, 316Y where systems 302a, 302N have storage provisioned thereon for use by the hosts 316a,316Y and virtual machines and applications executing thereon.

Generally, each aggregator 310a, 310b may perform data storage management for one or more hosts where each such host may have one or more initiator ports included in data paths to one or more data storage systems 302a, 302N. In a manner similar to that as described elsewhere herein for a single host, an aggregator may perform management for one or more hosts and may therefore include client management software to perform processing as described herein with a usage context representing a collective or aggregate usage context for the one or more hosts being managed by the aggregator. Aggregator 310a may define its usage context as all objects related to a set of host initiators where the set is the collective or aggregate of all initiator ports for hosts managed by aggregator 310a. Aggregator 310b may define its usage context as all objects related to a set of host initiators where the set is the collective or aggregate of all initiator ports for hosts managed by aggregator 310b. To further illustrate, aggregator 310a is performing data storage configuration management for hosts 306a, 306M and may have a usage context identifying initiator ports I1-I4. Aggregator 310b is performing data storage configuration management for hosts 316a, 316Y and may have a usage context identifying initiator ports I5-I8. In this example, data storage system 302a has a single client aggregator 310a and data storage system 302N has two client aggregators 310a, 310b. Each aggregator may report data storage configuration information on the topology and health from the context or viewpoint of the hosts said aggregator is managing. Each of 310a, 310b may be a separate server system having a management console connected thereto upon which information may be displayed based on each aggregator's usage context. Each aggregator 310a, 310b may use such a view or context for reporting storage provisioned for use by any of its managed hosts, reporting on a status or health of components in paths used to access provisioned storage, and the like. The number of hosts of each aggregator 310a, 310b may generally be any number of hosts where each such aggregator 310a, 310b may perform management for a different number of such hosts. In connection with FIG. 6, and more generally any of the examples and figures described herein, the particular number of components (e.g., number of hosts, number of aggregators, number of data storage systems, etc.) is for purposes of illustration and should not be construed as applying a limit to an embodiment in accordance with techniques herein.

As a further variation to the embodiment illustrated in FIG. 6, an embodiment may have hosts which do not provide virtualized environments and in such an embodiment each of 310a, 310b may be more generally described as performing aggregate management of multiple hosts where such hosts may or may not provide virtualized or other types of environments. Furthermore, rather than have an aggregator 310a, a single host such as 316a may provide a virtualized environment as described herein whereby the host includes the client management software 312a and communicates with any one or more of the data storage systems providing storage and storage management services.

Thus, with reference to the particular example of FIG. 6, an embodiment in accordance with techniques herein may be used with a provider included in a data storage system where the provider provides storage management services for only block-based services. In such an embodiment, the provider may be included as a component 303a-303N in server management software 304a-304N on the data storage systems where each such provider 303a-303N may include a common layer 516 and a platform specific layer 518 having the block services module 610 loaded. Each of the elements 304a-304N may include components such as those described herein, for example, the components of 540 in FIG. 3 and also in accordance with FIG. 4. Additionally, in accordance with techniques herein, components 310a, 310b may function as clients in a manner similar to element 502 of FIG. 3 whereby components 310a, 310b may issue debug commands to the provider to debug code of a provider 303a-303N providing such data storage management and configuration information to the clients. In this manner, a client, such as one of the aggregators 310a, 310b may issue debug commands to a provider, such as 303a, using the debug API as described herein whereby code of the provider 303a includes appropriate support for use with the debug API as described herein. As will be appreciated by those skilled in the art, a client (such as component 310a functioning as a client 502 of FIG. 3) issuing debug commands using the debug API as described herein for debugging code of a provider of storage management services for virtualized systems and environments does not have to actually host or include the client management software (e.g., 312a, 312b) or otherwise store data on a data storage system. More generally, such a client issuing debug commands in accordance with techniques herein may be any suitable system to facilitate debugging code of the providers 303a-303N of storage management services for use in storage management for virtualized systems and environments. Thus, in connection with FIG. 6 and other exemplary embodiments herein, the client issuing the debug commands in accordance with the debug API of FIG. 5 to a provider included in the data storage system may or may not also be a storage client of the data storage system (e.g., the client issuing the debug commands (debug client) may also be a "storage client" having its own storage provisioned in the data storage system, or may otherwise not also be such a "storage client").

Described herein are techniques that may be used in connection with providing a debug interface or API for providers that allows debug support for both common layers and platform specific layers (or more generally customized modules as described herein) of the provider in a way that may be extended without changing the debug Interface. The interface may be defined as described herein to include a debug command with an optional and variable number of debug command specific parameters. An interface in accordance with techniques herein provides for flexibility and extensibility and also allows platform specific layers to implement their own customized set of debug commands and parameters without requiring code changes to other provider layers beyond the platform specific layer.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of debugging code of a provider comprising:
receiving a debug interface for a provider included in a server, said provider including a first software layer providing common services and a second software layer including a plurality of code modules wherein each of said plurality of code modules provides a set of customized services, said common services being used in combination with the set of customized services provided by any of said plurality of code modules, said debug interface including a first function interface for a first function having first code included in said first software layer and including a second function interface for a second function having second code included in said first software layer which provides for runtime transfer of control to code included in said second software layer, said first function being invoked to issue any of a first set of debug commands to debug code in the first software layer and said second function being invoked to issue any of a second set of debug commands to debug code in the second software layer, wherein said second function is a same function used to issue debug commands to each of the plurality of code modules of the second software layer;
sending, by a client to said server, a first debug command using said debug interface, wherein said first debug command is used to debug code included in said second software layer and said first debug command is sent to said server by said client calling said second function in accordance with said second function interface; and
performing first processing on said server for processing said first debug command, said first processing including:
invoking said second function by transferring runtime control to said second code of the first software layer, wherein said second code then passes the first debug command through to the second software layer by invoking third code in one of the plurality of code modules of the second software layer, said third code performing second processing for the first debug command including syntactic processing and semantic processing interpreting said first debug command and performing an action based on semantics of said first debug command.

2. The method of claim 1, wherein said first function interface includes a first parameter representing a debug command issued to debug code of the first layer.

3. The method of claim 2, wherein said first function interface indicates that an invocation of said first function optionally includes one or more additional parameters representing parameters of a debug command represented as the first parameter in the invocation.

4. The method of claim 3, wherein the first layer includes code for processing each debug command in the first set of debug commands.

5. The method of claim 1, wherein said second function interface includes a first parameter representing a debug command issued to debug code of the second layer.

6. The method of claim 5, wherein said second function interface indicates that an invocation of said second function optionally includes one or more additional parameters representing parameters of a debug command represented as the first parameter in the invocation.

7. The method of claim 6, wherein the second layer includes code for processing each debug command in the second set of debug commands.

8. The method of claim 1, wherein the second set of debug commands is used to debug code in a first code module of the second layer and a third set of debug commands is used to debug code in a second code module of the second layer, a first portion of debug commands in the second set not being included in the third set whereby the first portion of debug commands are not recognized by code of the second code module as valid debug commands for debugging code of the second code module.

9. The method of claim 1, wherein said second code passing the first debug command through to the second software layer includes said second code not performing syntactic or semantic processing of the first debug command prior to invoking said third code.

10. The method of claim 1, wherein said second layer is a platform specific layer and each of the plurality of code modules provides a different set of platform specific services.

11. The method of claim 10, wherein the plurality of code modules provide sets of services for a plurality of data storage system platforms, said server is included in a data storage system in accordance with one of the plurality of data storage system platforms providing data storage services to the client, and the common services includes services provided for use with each of the plurality of data storage system platforms, each of the plurality of code modules providing a set of services for a different one of the plurality of data storage system platforms wherein each of the plurality of data storage system platforms varies with properties related to any of hardware and software of a data storage system.

12. The method of claim 11, wherein a first of the plurality of data storage system platforms provides block-based storage services in connection with data storage system management and configuration and a second of the plurality of data storage system platforms provides file-based storage services in connection with data storage system management and configuration, a first of the plurality of code modules including code providing said block-based services and a second of the plurality of code modules including code providing said file-based services, said common services of the first layer including services used in connection with data storage system management across all the plurality of data storage system platforms.

13. The method of claim 12, wherein the provider provides data storage management services to the client and wherein the client is a host system providing a virtualized environment and having a plurality of virtual machines executing on the host system, the plurality of virtual machines having applications executing thereon which have application data stored on provisioned storage of storage devices of the data storage system.

14. The method of claim 12, wherein the provider provides data storage management services to the client and wherein the client is an aggregator providing collective data storage management for a plurality of hosts, each of the plurality of hosts providing a virtualized environment and having one or more virtual machines executing on said each host, each of the one or more virtual machines having an application executing in a context of said each virtual machine wherein the application has its application data stored on provisioned storage of storage devices of the data storage system.

15. The method of claim 12, wherein the provider provides data storage management services for use in connection with data storage management and configuration in a virtualized environment whereby the data storage management and configuration is performed for managing storage provisioned for use by a plurality of virtual machines hosting applications each having application data stored on provisioned storage of storage devices of the data storage system.

16. A non-transitory computer readable medium that includes code for debugging code of a provider, the non-transitory computer readable medium comprising code for:
receiving a debug interface for a provider included in a server, said provider including a first software layer providing common services and a second software layer including a plurality of code modules wherein each of said plurality of code modules provides a set of customized services, said common services being used in combination with the set of customized services provided by any of said plurality of code modules, said debug interface including a first function interface for a first function having first code included in said first software layer and including a second function interface for a second function having second code included in said first software layer which provides for runtime transfer of control to code included in said second software layer, said first function being invoked to issue any of a first set of debug commands to debug code in the first software layer and said second function being invoked to issue any of a second set of debug commands to debug code in the second software layer; and
sending, by a client to said server, a first debug command using said debug interface, wherein said first debug command is used to debug code included in a specific one of said first software layer or said second software layer, wherein if said specific one is said first software layer, said sending includes issuing a call to said first function, and if said specific one is said second software layer, said sending includes issuing a call to said second function.

17. A non-transitory computer readable medium comprising code stored thereon for debugging code of a provider, the non-transitory computer readable medium comprising code for:
receiving a debug interface for a provider included in a server, said provider including a first software layer providing common services and a second software layer including a plurality of code modules wherein each of said plurality of code modules provides a set of customized services, said common services being used in combination with the set of customized services provided by any of said plurality of code modules, said debug interface including a first function interface for a first function having first code included in said first software layer and including a second function interface for a second function having second code included in said first software layer which provides for runtime transfer of control to code included in said second software layer, said first function being invoked to issue any of a first set of debug commands to debug code in the first software layer and said second function being invoked to issue any of a second set of debug commands to debug code in the second software layer, wherein said second function is a same function used to issue debug commands to each of the plurality of code modules of the second software layer;

sending, by a client to said server, a first debug command using said debug interface, wherein said first debug command is used to debug code included in said second software layer and said first debug command is sent to said server by said client calling said second function in accordance with said second function interface; and performing first processing on said server for processing said first debug command, said first processing including:

invoking said second function by transferring runtime control to said second code of the first software layer, wherein said second code then passes the first debug command through to the second software layer by invoking third code in one of the plurality of code modules of the second software layer, said third code performing second processing for the first debug command including syntactic processing and semantic processing interpreting said first debug command and performing an action based on semantics of said first debug command.

18. The non-transitory computer readable medium of claim 17, wherein said first function interface includes a first parameter representing a debug command issued to debug code of the first layer.

19. The non-transitory computer readable medium of claim 18, wherein said first function interface indicates that an invocation of said first function optionally includes one or more additional parameters representing parameters of a debug command represented as the first parameter in the invocation.

20. The non-transitory computer readable medium of claim 19, wherein the first layer includes code for processing each debug command in the first set of debug commands.

\* \* \* \* \*